United States Patent
Tan et al.

(10) Patent No.: US 12,536,160 B2
(45) Date of Patent: Jan. 27, 2026

(54) USING A COMPILER TO MODIFY PROMPTS FOR MACHINE LEARNING MODELS USED TO GENERATE DATABASE QUERIES

(71) Applicant: Wai'i, Inc., Wilmington, DE (US)

(72) Inventors: Wangda Tan, San Jose, CA (US); Gunther Hagleitner, San Jose, CA (US); Bhupendra Singh, Mhow (IN); Rajesh Balamohan, Bangalore (IN); Swaraj Nayegandhi, San Francisco, CA (US)

(73) Assignee: Wai'i, Inc., Wilmington, DE (US)

( * ) Notice: Subject to any disclaimer, the term of this patent is extended or adjusted under 35 U.S.C. 154(b) by 0 days.

(21) Appl. No.: 18/402,216

(22) Filed: Jan. 2, 2024

(65) Prior Publication Data

US 2025/0217351 A1     Jul. 3, 2025

(51) Int. Cl.
| | |
|---|---|
| *G06F 16/20* | (2019.01) |
| *G06F 16/242* | (2019.01) |
| *G06F 16/2453* | (2019.01) |
| *G06F 40/211* | (2020.01) |

(52) U.S. Cl.
CPC .... *G06F 16/2423* (2019.01); *G06F 16/24534* (2019.01); *G06F 40/211* (2020.01)

(58) Field of Classification Search
CPC ........... G06F 16/2423; G06F 16/24534; G06F 40/211
See application file for complete search history.

(56) References Cited

U.S. PATENT DOCUMENTS

| | | | |
|---|---|---|---|
| 11,704,307 B2 * | 7/2023 | Maheshwari | G06F 16/2423 707/767 |
| 12,158,906 B2 * | 12/2024 | Hemington | G06F 16/338 |
| 2020/0097389 A1 * | 3/2020 | Smith | G06F 11/0793 |
| 2020/0342670 A1 * | 10/2020 | Nattinger | G06V 20/20 |
| 2022/0197900 A1 * | 6/2022 | Maheshwari | G06F 16/90324 |
| 2023/0306061 A1 * | 9/2023 | Bui | G06F 16/9032 |
| 2024/0070270 A1 * | 2/2024 | Mace | G06F 21/554 |
| 2024/0256423 A1 * | 8/2024 | Zhang | G06F 8/71 |
| 2024/0256764 A1 * | 8/2024 | Maschmeyer | G06F 16/3328 |
| 2024/0303710 A1 * | 9/2024 | Tan | G06Q 30/0282 |

(Continued)

FOREIGN PATENT DOCUMENTS

WO    WO2020061587 A1 *  3/2020

*Primary Examiner* — Daniel A Kuddus
(74) *Attorney, Agent, or Firm* — Lowenstein Sandler LLP

(57) ABSTRACT

A method for using a compiler to modify prompts for MLMs used to generate database queries includes receiving, at a query compiler, a first query of a database. The first query is at least in part generated by an MLM. The method includes determining, by the query compiler, whether the first query comprises an uncorrectable error. The method includes, responsive to determining that the first query comprises an uncorrectable error, generating a prompt element that describes the uncorrectable error and that is structured for inclusion in a prompt requesting the MLM to generate a modified first query that corrects the uncorrectable error. The method may include generating the prompt for the MLM, providing the prompt to the MLM, and responsive to providing the prompt, receiving, at the database query compiler, the modified first query that corrects the uncorrectable error.

20 Claims, 10 Drawing Sheets

(56) References Cited

U.S. PATENT DOCUMENTS

| | | | |
|---|---|---|---|
| 2024/0320251 A1* | 9/2024 | Hemington | G06F 16/338 |
| 2024/0330279 A1* | 10/2024 | Truong | G06F 16/2428 |
| 2024/0362209 A1* | 10/2024 | Almaer | G06F 16/245 |
| 2024/0378399 A1* | 11/2024 | Gandhi | G06F 40/40 |
| 2024/0394545 A1* | 11/2024 | Eisenschlos | G06F 9/453 |

* cited by examiner

300 ↙

Given the following database tables, generate an SQL query that lists the name and corresponding student ID number of all students that are currently enrolled in Biology 204 and whose grade in the class is less than 80%.

↖ 302

```
Table STUDENTS | Definition: name, type
name, TEXT
studentID, NUMBER
GPA, NUMBER
birthday, DATE
address, TEXT Table CLASSES | Definition: name, type
name, TEXT
instructorID, NUMBER
day, TEXT
time, TEXT
```

← 304

```
Table ENROLLMENT | Definition: name, type
studentID, NUMBER
class, TEXT

Table GRADES | Definition: name, type
studentID, NUMBER
class, TEXT
grade, NUMBER
```

```
Table References: source_table(col1,col2,…) ->
ref_table(col1,col2,…)
STUDENTS(studentID)->ENROLLMENT(studentID)
STUDENTS(studentID)->GRADES(studentID)
CLASSES(name)->ENROLLMENT(class)
CLASSES(name)->GRADES(class)
```

Given the following database tables and references:

Table STUDENTS | Definition: name, type
name, TEXT
studentID, NUMBER          ← 304
GPA, NUMBER
birthday, DATE
address, TEXT

[. . .]

CLASSES(name)->ENROLLMENT(class)     ← 306
CLASSES(name)->GRADES(class)

```
WITH all_students AS (                                         402
    SELECT name, studentID from students;
), biology_students AS (
    SELECT studentID FROM all_students WHERE all_students.studentID =
enrollment.studentID AND enrollment.class = "Biology 204";
), under_eighty AS (
     SELECT name, studentID FROM biology_students WHERE
biology_students.studentID = grades.studentID AND grades.number <
80;
```

The above database query produces and error stating that the "name" column is missing from the biology_students common table expression. Locate the correct column to fix the query.

```
┌─────────────────────────────────────────────┐
│ Receive, at a query compiler, a first query │
│             of a database                    │
│                   502                        │
└─────────────────────────────────────────────┘
                      │
                      ▼
┌─────────────────────────────────────────────┐
│ Determine, by the query, compiler, whether  │
│    the first query comprises an uncorrected │
│                    error                     │
│                    504                       │
└─────────────────────────────────────────────┘
                      │
                      ▼
┌─────────────────────────────────────────────┐
│  Generate a prompt element that describes   │
│  the uncorrectable error and that is        │
│  structured for inclusion in a prompt for   │
│  an MLM requesting generation of a          │
│  modified first query that corrects the     │
│           uncorrectable error                │
│                    506                       │
└─────────────────────────────────────────────┘
```

FIG. 5A

USING A COMPILER TO MODIFY PROMPTS FOR MACHINE LEARNING MODELS USED TO GENERATE DATABASE QUERIES

TECHNICAL FIELD

Aspects and embodiments of the disclosure relate to databases, and more specifically, to systems and methods for using a compiler to modify prompts for machine learning models used to generate database queries.

BACKGROUND

Users interact with databases using database queries. Such queries are often implemented using a structured query language (SQL) dialect. Recently, the use of machine learning models (MLMs), including large language models (LLMs), has rapidly increased. Some LLMs have the capability of generating database queries from natural language prompts.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure provides a computer-implemented method, including: receiving, at a query compiler, a first query of a database, the first query at least in part generated by a machine learning model (MLM); determining, by the query compiler, whether the first query includes an uncorrectable error; and responsive to determining that the first query includes an uncorrectable error, generating a prompt element that describes the uncorrectable error and that is structured for inclusion in a prompt requesting the MLM to generate a modified first query that corrects the uncorrectable error.

In some embodiments, the method further includes: generating the prompt for the MLM; providing the prompt to the MLM; and responsive to providing the prompt, receiving, at the database query compiler, the modified first query that corrects the uncorrectable error.

In some embodiments, the uncorrectable error includes an error in the first query that is uncorrectable by the query compiler. In one embodiment, the prompt element identifies a location of the uncorrectable error in the first query. In one or more embodiments, the prompt element identifies instructions to correct the uncorrectable error. In one embodiment, the MLM includes a large language model (LLM).

In some embodiments, the method further includes: parsing, at the query compiler, the first query into an abstract syntax tree (AST). Determining whether the first query includes the uncorrectable error includes analyzing the AST to identify the uncorrectable error. In some embodiments, the method further includes: determining whether the first query further includes a correctable error; and responsive to determining that the first query includes a correctable error, modifying the AST to correct the correctable error. In one embodiment, the method further includes: converting the modified AST to a second query of the database; and including the second query in the prompt for the MLM.

A further aspect of the disclosure provides a system that includes a memory and a processing device, coupled to the memory. The processing device is configured to perform a method according to any aspect or embodiment described herein. A further aspect of the disclosure provides a computer-readable medium that includes instructions that, responsive to execution by a processing device, cause the processing device to perform operations that include a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

FIG. 3 depicts an example prompt provided to a machine learning model, in accordance with some embodiments of the disclosure.

FIG. 4 depicts another example prompt provided to a machine learning model, in accordance with some embodiments of the disclosure.

FIG. 5A depicts a flow diagram of an example method of using a compiler to modify prompts for MLMs used to generate database queries, in accordance with some embodiments of the disclosure.

DETAILED DESCRIPTION

Figure 1:
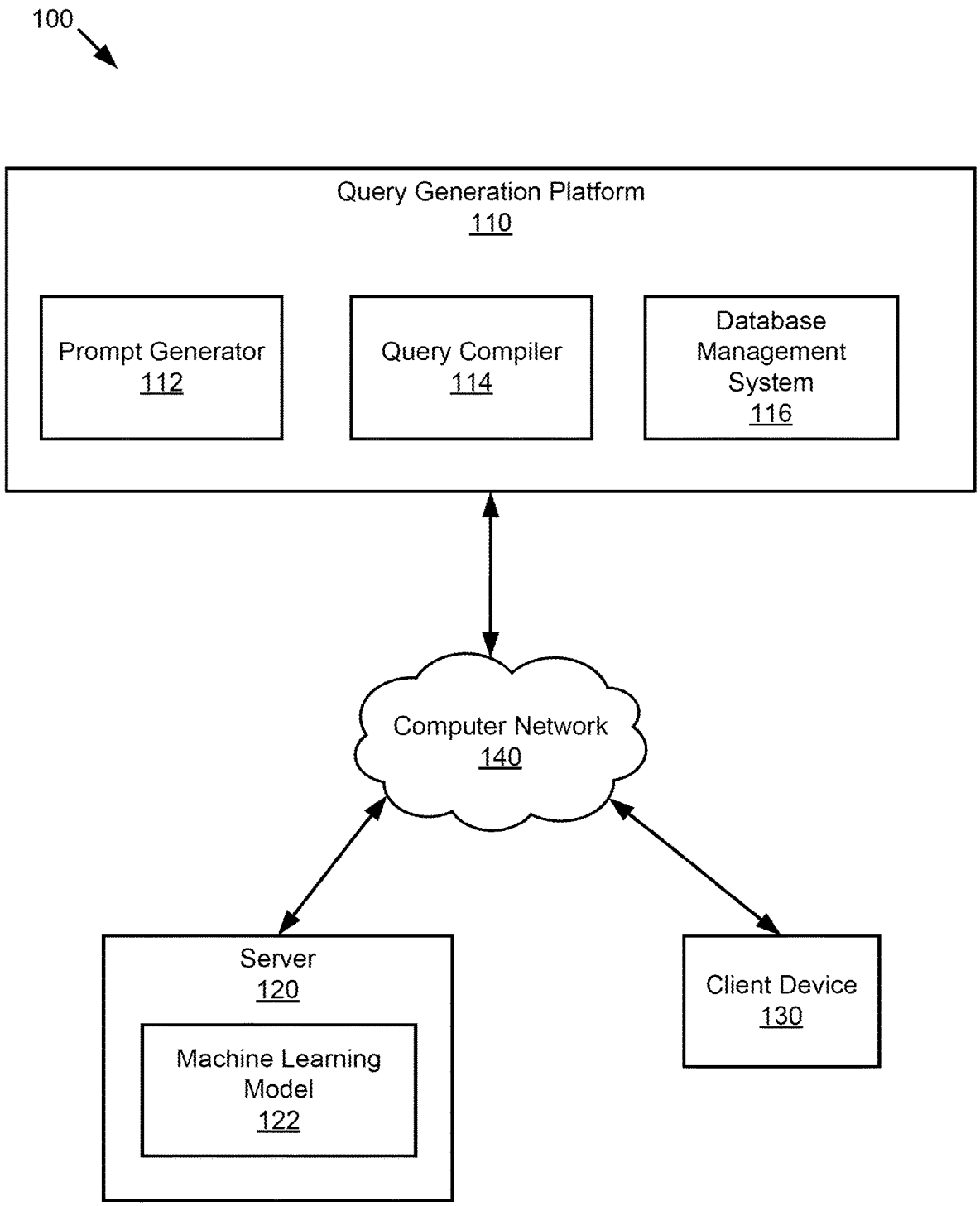
FIG. 1 illustrates an example system architecture, in accordance with some embodiments of the disclosure.

A machine learning model (MLM), such as a generative MLM may be capable of generating a database query in response to receiving a natural language input. A database query can be written in a query language that is specific to a database management system. Each query language and dialect may have a specific syntax and/or features. For example, a user may generate a text prompt that includes, "Generate a SQL query that retrieves all customer names, addresses, and phone numbers who have spent over $100 this year." The MLM may receive the text prompt as an input prompt and may generate a database query, such as a structured query language (SQL) query that attempts to perform the requested action. For example, the MLM may include a large language model (LLM) that may have undergone an unsupervised learning process where the LLM was trained on a large corpus of textual training data so as to process, analyze, and generate human-like text based on given input.

The database query generated by the LLM, however, may include one or more errors. The database query may include these one or more errors for a variety of reasons. First, LLMs often employ an element of randomness when generating responses. The randomness can help the LLM not be deterministic (e.g., inputting the same prompt into the LLM may produce different outputs). While this randomness is beneficial in some situations, it can also introduce errors into the database query. Second, the corpus of text use to train the LLM may include different dialects, such as different SQL dialects. Thus, sometimes, the LLM may begin its response by generating an SQL query in a first SQL dialect, however, due to the randomness previously mentioned or due to the way the LLM was trained, the LLM may switch to a second SQL dialect partway through generating a response. Third, generally, LLMs predict the next token (e.g., word(s)) to output, and the prediction is based on how the LLM's training process configured the LLM. However, the prediction may be incorrect. Lastly, the prompt provided to the LLM may not include sufficient context for the LLM to generate an accurate answer. The context may include database table names, schemas, how tables are joined, or other database information that may be helpful in generating a database query.

Aspects of the disclosure address the above-mentioned and other challenges by providing a system capable of one or more of (1) generating an MLM prompt that requests the LLM to generate a database query; (2) analyzing the database query generated by the MLM to determine if the query contains any uncorrectable errors; and (3) generating a second prompt (e.g., a modified prompt in natural language) that requests the LLM to correct the errors in the database query. In some embodiments, the system may be configured to generate an MLM prompt. A prompt can refer to an input (e.g., a specific input) or instruction provided to a MLM to generate a response. The prompt may be written, at least in part, in natural language (e.g., natural language prompt). In some embodiments, the MLM prompt may include a request for the MLM to generate a database query. The prompt may also include context data that may assist the MLM in generating the database query. The system may provide the database query generated by the MLM to a query compiler. The query compiler may parse the database query and determine whether the database query has any errors. If the query has one or more errors, the query compiler may attempt to correct the errors. If the query compiler is not able to correct an error, the query compiler may provide the database query (with the correctable errors corrected) to a prompt generator. The prompt generator may generate a prompt (e.g., natural language prompt) for the MLM that includes one or more of (1) the database query, (2) data that provides information describing the uncorrectable error(s) (e.g., natural language description of the errors and instructions on how to correct the error(s)), and (3) context data that may help the MLM in correcting the error(s). The prompt generator may submit the prompt to the MLM so the MLM can generate a modified database query that corrects the error(s) remaining in the original database query. The MLM may then provide a response with a modified database query that corrects the error(s) that the query compiler was not able to correct. The system may then submit the modified query to the query compiler, which may then submit the database query to a database management system to execute the query.

As noted, a technical problem addressed by embodiments of the disclosure is the inaccuracy (e.g., inclusion of errors) of a database query generated by a MLM. A technical solution to the above-identified technical problem may include implementing a system, such as a query compiler, that is able to automatically correct some of the errors and generate a database query with some of the errors corrected and automatically generating an MLM prompt that provides sufficient data for the MLM to correct the remaining errors. The technical solution results in accurate database queries generated by an MLM.

FIG. 1 illustrates an example system architecture 100, in accordance with some embodiments of the disclosure. The system architecture 100 (also referred to as a "system" herein) includes a query generation platform 110, a server 120, and a client device 130, which may be in data communication with each other over a computer network 140. The query generation platform 110 may include a prompt generator 112, a query compiler 114, or a database management system (DBMS) 116. The server 120 may include an MLM 122.

In one embodiment, the query generation platform 110 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to data or services. Such computing devices may be positioned in a single location or may be distributed among many different geographical locations. For example, the query generation platform 110 may include multiple computing devices that together may include a hosted computing resource, a grid computing resource, or any other distributed computing arrangement. In some embodiments, the query generation platform 110 may correspond to an elastic computing resource where the allotted capacity of processing, network, storage, or other computing-related resources may vary over time.

In one or more embodiments, the prompt generator 112 may be implemented as software, hardware, or a combination of software and hardware. The prompt generator 112 may include a software application or a set of program instructions that executes on a computing device of the query generation platform 110. The prompt generator 112 may be configured to receive data from the client device 130 (e.g., a request for the MLM 122 to generate a database query), use the data and other data from the query generation platform 110 to generate an MLM prompt, submit the MLM prompt to the server 120, receive a response from the server 120 (which may include a database query), and provide at least a portion of the response to the query compiler 114. The prompt generator 112 may receive data from the query compiler 114 or the DBMS 116 and generate a response to the client device 130 based on the received data (e.g., data generated in response to executing the database query at the DBMS 116).

In some embodiments, the query compiler 114 may also be implemented as software, hardware, or a combination of software and hardware. The query compiler 114 may include a software application or a set of program instructions that executes on a computing device of the query generation platform 110. In some embodiments, the query compiler 114 may convert database queries into a low-level language compatible with the DBMS 116. In some embodiments, the query compiler 114 of the present disclosure may include features and functionality that are not included in software compilers (e.g., a source code compiler).

A software compiler may accept source code (e.g., source code written in an object-oriented programming language) as input. The software compiler may tokenize the source code (e.g., divide the source code into one or more basic components) and analyze the syntax of the tokens. Responsive to one or more tokens not conforming to expected syntax rules implemented by the compiler, the compiler may output one or more error message for a computing system to display to a user. The one or more messages may not be natural language. Responsive to the source code not including any errors, the software compiler may convert the source code into machine code, which may include a language that is compatible with a processing device on which the machine code will execute. The compiler may store the machine code as a file on the computing device. The computing device may then execute the file.

In contrast to software compilers, in one embodiment, the query compiler 114 of the present disclosure may receive a database query as input from the prompt generator 112, convert the database query to an abstract syntax tree (AST), determine whether the AST has one or more errors, and correct any errors in the AST that the query compiler 114 is capable of correcting. Responsive to the AST not containing any errors (e.g., because the query compiler 114 was able to correct all of the errors, or the database query did not have any errors), the query compiler 114 may convert the AST back to a database query and send the database query to the client device 130. In some embodiments, responsive to the AST not containing any errors, the query compiler 114 may output the AST to the DBMS 116 for execution. Responsive to the AST containing at least one error (e.g., because the query compiler 114 was not able to correct at least one error in the AST), the query compiler 114 may convert the AST back to a database query. The query compiler 114 may generate one or more prompt elements that include information that may assist the prompt generator 112 to generate a prompt to have the MLM 122 correct any uncorrectable errors. A prompt element may include one or more of natural language text that describes the at least one error, a location in the database query that contains the error, a suggestion on how to correct the error, or other information. The query compiler 114 may output the database query and the one or more prompt elements to the prompt generator 112.

In one embodiment, the DBMS 116 may also be implemented as software, hardware, or a combination of software and hardware. The DBMS 116 may include a software application or a set of program instructions that executes on a computing device of the query generation platform 110. The DBMS 116 may include a database that stores the data managed by the DBMS 116. The DBMS 116 may include a query processor that may optimize or execute database queries. The DBMS 116 may include a metadata catalog, which may store data about the database, such as table or column names, column data types, a database schema, data indicating relationships between tables, a knowledge graph that indicates relationships between database objects for generating database queries, etc. The DBMS 116 may include a log manager configured to track changes to the database. The DBMS 116 may include reporting or monitoring tools that may generate reports or monitor usage regarding the database. The DBMS 116 may include other data or functionality configured to operate the database.

In one embodiment, the DBMS 116 may be compatible with one or more database query languages or one or more database query language dialects. In some embodiments, a database query language may include a type of programming language configured to interact with and manage data stored in a database. A database query language may provide functionality to define, manipulate, and control data within a DBMS. In one embodiment, the database query language may include SQL. SQL can be implemented in one of multiple dialects. A dialect, such as a SQL dialect may be a variant of the standard language, such as a standard SQL language that is specific to a particular DBMS. Different DBMSs may have different features and capabilities, and the standard language (e.g., standard SQL language) may not encompass all variations.

Figure 2A:
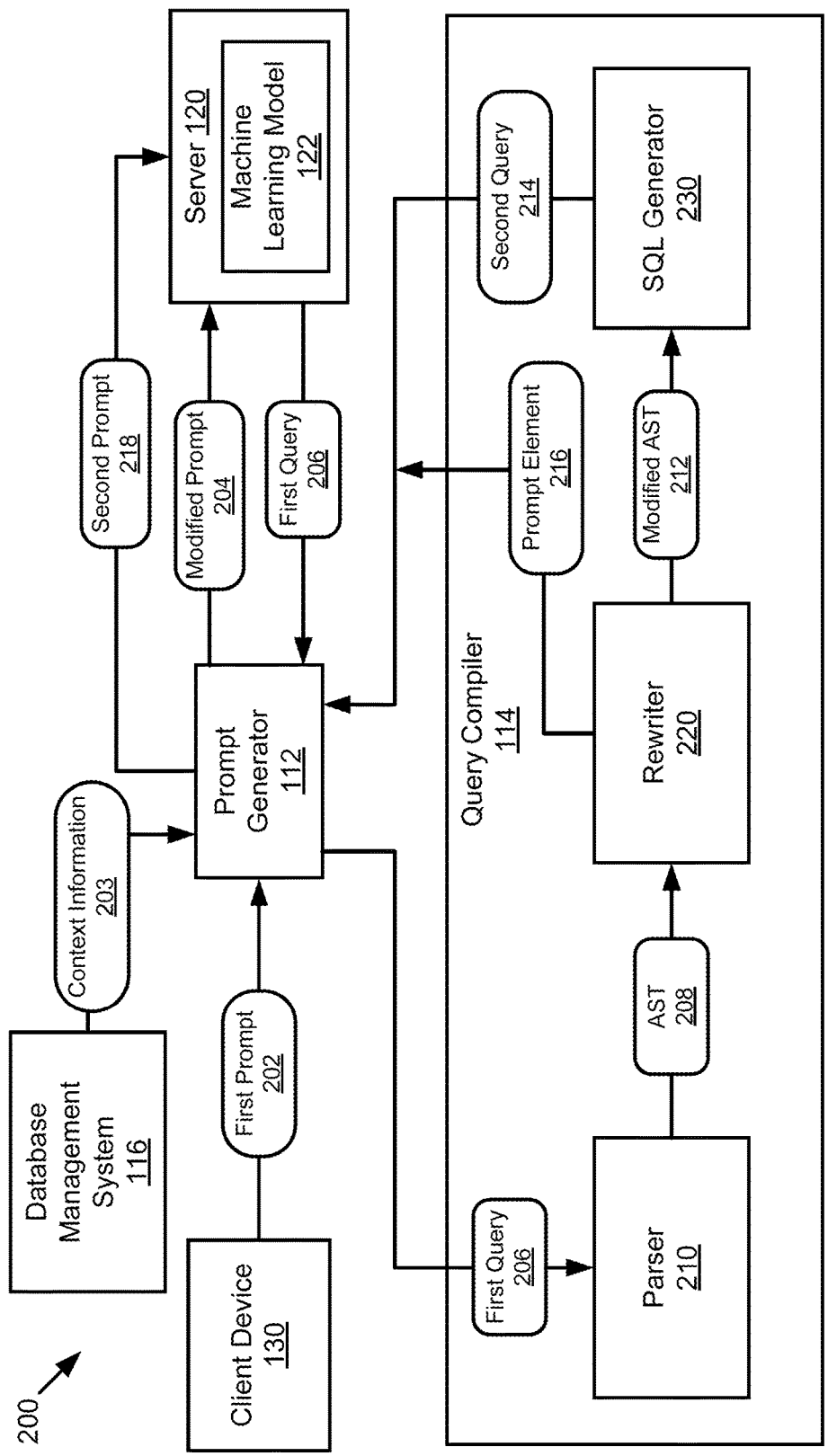
FIG. 2A illustrates an example system architecture for using a compiler to modify prompts for machine learning models (MHLMs) used to generate database queries, in accordance with some embodiments of the disclosure.

In one embodiment, the DBMS 116 may store metadata obtained from an external database (not shown in FIG. 2A). The external database may include a database operated or controlled by an entity that operates or controls the client device 130. The external database may include tables, columns, or other data controlled or stored by the entity that operates or controls the client device 130 (e.g., customer data, sales data, product data, or other business data). The metadata obtained from the external database may include table names, column names, column data types, a database schema, data indicating relationships between tables, etc. The DBMS 116 may store the metadata in the database of the DBMS 116.

In one or more embodiments, the server 120 may include a computing device. The server 120 may be separate from the query generation platform 110 and may be operated by an entity that is different from the entity that operates the query generation platform 110. The server 120 may include the MLM 122.

In some embodiments, the MLM 122 may include one or more of artificial neural networks (ANNs), decision trees, random forests, support vector machines (SVMs), clustering-based models, Bayesian networks, or other types of machine learning models. ANNs generally include a feature representation component with a classifier or regression layers that map features to a target output space. The ANN can include multiple nodes ("neurons") arranged in one or more layers, and a neuron may be connected to one or more neurons via one or more edges ("synapses"). The synapses may perpetuate a signal from one neuron to another, and a weight, bias, or other configuration of a neuron or synapse may adjust a value of the signal. Training the ANN may include adjusting the weights or other features of the ANN based on an output produced by the ANN during training.

An ANN may include, for example, a convolutional neural network (CNN), recurrent neural network (RNN), or a deep neural network. A CNN, a specific type of ANN, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs). A deep network may include an ANN with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. An RNN is a type of ANN that includes a memory to enable the ANN to capture temporal dependencies. An RNN is able to learn input-output mappings that depend on both a current input and past inputs. The RNN will address past and future measurements and make predictions based on this continuous measurement information. One type of RNN that may be used is a long short term memory (LSTM) neural network.

ANNs may learn in a supervised (e.g., classification) or unsupervised (e.g., pattern analysis) manner. Some ANNs (e.g., such as deep neural networks) may include a hierarchy of layers, where the different layers learn different levels of representations that correspond to different levels of abstraction. In deep learning, each level learns to transform its input data into a slightly more abstract and composite representation.

In one embodiment, the MLM 122 may include a generative machine learning model (also referred to as "generative artificial intelligence (AI) model" herein). A generative AI model can deviate from a machine learning model based on the generative AI model's ability to generate new, original data, rather than making predictions based on existing data patterns. A generative AI model can include a generative adversarial network (GAN), a variational autoencoder (VAE), or a large language model (LLM). In some instances, a generative AI model can employ a different approach to training or learning the underlying probability distribution of training data, compared to some machine learning models. For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

Generative AI models also have the ability to capture and learn complex, high-dimensional structures of data. One aim of generative AI models is to model underlying data distribution, allowing them to generate new data points that possess the same characteristics as training data. Some machine learning models (e.g., that are not generative AI models) focus on optimizing specific prediction of tasks.

In some embodiments, the MLM 122 can be an AI model that has been trained on a corpus of data. In some embodiments, the MLM 122 can be a model that is first pre-trained on a corpus of data to create a foundational model, and afterwards is fine-tuned on more data pertaining to a particular set of tasks to create a more task-specific, or targeted, model. The foundational model can first be pre-trained using a corpus of data that can include data in the public domain, licensed content, and/or proprietary content. Such a pre-training can be used by the MLM 122 to learn broad elements including, image or speech recognition, general sentence structure, common phrases, vocabulary, natural language structure, computer code structure (including SQL queries), and other elements. In some embodiments, this first, foundational model can be trained using self-supervision, or unsupervised training on such datasets.

In some embodiments, the second portion of training, including fine-tuning, may be unsupervised, supervised, reinforced, or any other type of training. In some embodiments, this second portion of training may include some elements of supervision, including learning techniques incorporating human or machine-generated feedback, undergoing training according to a set of guidelines, or training on a previously labeled set of data, etc. In a non-limiting example associated with reinforcement learning, the outputs of the MLM 122 while training may be ranked by a user, according to a variety of factors, including accuracy, helpfulness, veracity, acceptability, or any other metric useful in the fine-tuning portion of training. In this manner, the MLM 122 can learn to favor these and any other factors relevant to users when generating a response. Further details regarding training are provided below.

In some embodiments, the MLM 122 may include one or more pre-trained models, or fine-tuned models. In a non-limiting example, in some embodiments, the goal of the "fine-tuning" may be accomplished with a second, or third, or any number of additional models. For example, the outputs of the pre-trained model may be input into a second AI model that has been trained in a similar manner as the "fine-tuned" portion of training above. In such a way, two more AI models may accomplish work similar to one model that has been pre-trained, and then fine-tuned.

As indicated above, in some embodiments, the MLM 122 may be one or more generative AI models, allowing for the generation of new and original content. The generative AI model can use other machine learning models including an encoder-decoder architecture including one or more self-attention mechanisms, and one or more feed-forward mechanisms. In some embodiments, the generative AI model can include an encoder that can encode input textual data into a vector space representation; and a decoder that can reconstruct the data from the vector space, generating outputs with increased novelty and uniqueness. The self-attention mechanism can compute the importance of phrases or words within a text data with respect to all of the text data. A generative AI model can also utilize the previously discussed deep learning techniques, including RNNs, CNNs, or transformer networks. Further details regarding generative AI models are provided herein.

As indicated above, in one or more embodiments, the MLM 122 can include an LLM. In some embodiments, the LLM can include generative AI functionality. In such embodiments, the MLM 122 can generate new content based on provided input data (e.g., a prompt from the prompt generator 112). The generative MLM 122 can be supported by a prompt subsystem (not shown), which may reside on the server 120. The prompt subsystem may enable a user or a component of the server 120 to access the generative MLM 122. The prompt subsystem may be configured to perform automated identification of, and facilitate retrieval of, relevant and timely contextual information for efficient and accurate processing of prompts by the MLM 122. Using the computer network 140 (or another network), the prompt subsystem may be in communication with the prompt generator 112. Communications between the prompt subsystem and the prompt generator 112 may be facilitated by a generative model application programming interface (API), in some embodiments. In additional or alternative embodiments, the generative model API can translate prompts generated by the prompt subsystem into unstructured natural-language format and, conversely, translate responses received from the MLM 122 into any suitable form (e.g., including any structured proprietary format as may be used by the prompt subsystem).

In some embodiments, the MLM 122 may be configured or trained to generate text data in response to an input prompt. The text data may include a request to generate a database query. The text data may include context data that may assist the MLM 122 in generating the database query.

In one embodiment, the client device 130 may include a type of computing device such as a desktop personal computer (PC), laptop computer, mobile phone, tablet computer, netbook computer, wearable device (e.g., smart watch, smart glasses, etc.), any type of mobile device, etc. In some embodiments, the client device 130 can be one or more computing devices, data stores, networks, software components, or hardware components. In some embodiments, the client device may also be referred to as a "user device." Although illustrated as a single device, client device 130 can include one or more devices in some embodiments.

In some embodiments, a client device 130 can implement or include one or more applications. An application of the client device 130 can be used to communicate (e.g., send and receive information) with the query generation platform 110. In some embodiments, the application can implement user interfaces (e.g., graphical user interfaces (GUIs)) that may be webpages rendered by a web browser and displayed on the client device 130 in a web browser window. In another embodiment, the user interfaces of the application may be included in a stand-alone application downloaded to the client device 130 and natively run on the client device 130 (also referred to as a "native application" or "native client application" herein).

In some embodiments, the client device 130 can communicate with the query generation platform 110 using one or more function calls, such as API function calls (also referred to as "API calls" herein). For example, the one or more function calls can be identified in a request using one or more application layer protocols, such as HyperText Transfer Protocol (HTTP) (or HTTP secure (HTTPS)), and that are sent to the query generation platform 110 from the client device 130 implementing the application. In some embodiments, the query generation platform 110 can respond to the requests from the client device 130 by using one or more API responses using an application layer protocol.

In one or more embodiments, the client device 130 may be operated by an entity other than an entity that operates the query generation platform 110 or the server 120. The client device 130 may be operated by a customer of the entity that operates the query generation platform 110. The client device 130 may use the application to interact with the query generation platform 110. A user of the client device 130 may use the application to generate a natural language input for the MLM 122 to generate a database query. The application may send the natural language input to the prompt generator 112 to process the input into a prompt for the MLM 122. The client device 130 may receive data from the prompt generator 112 indicating information about the database of the DBMS 116 (e.g., a notification that a database query executed successfully, a response from the database, etc.).

In some embodiments, the computer network 140 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, or a combination thereof.

Figure 2B:
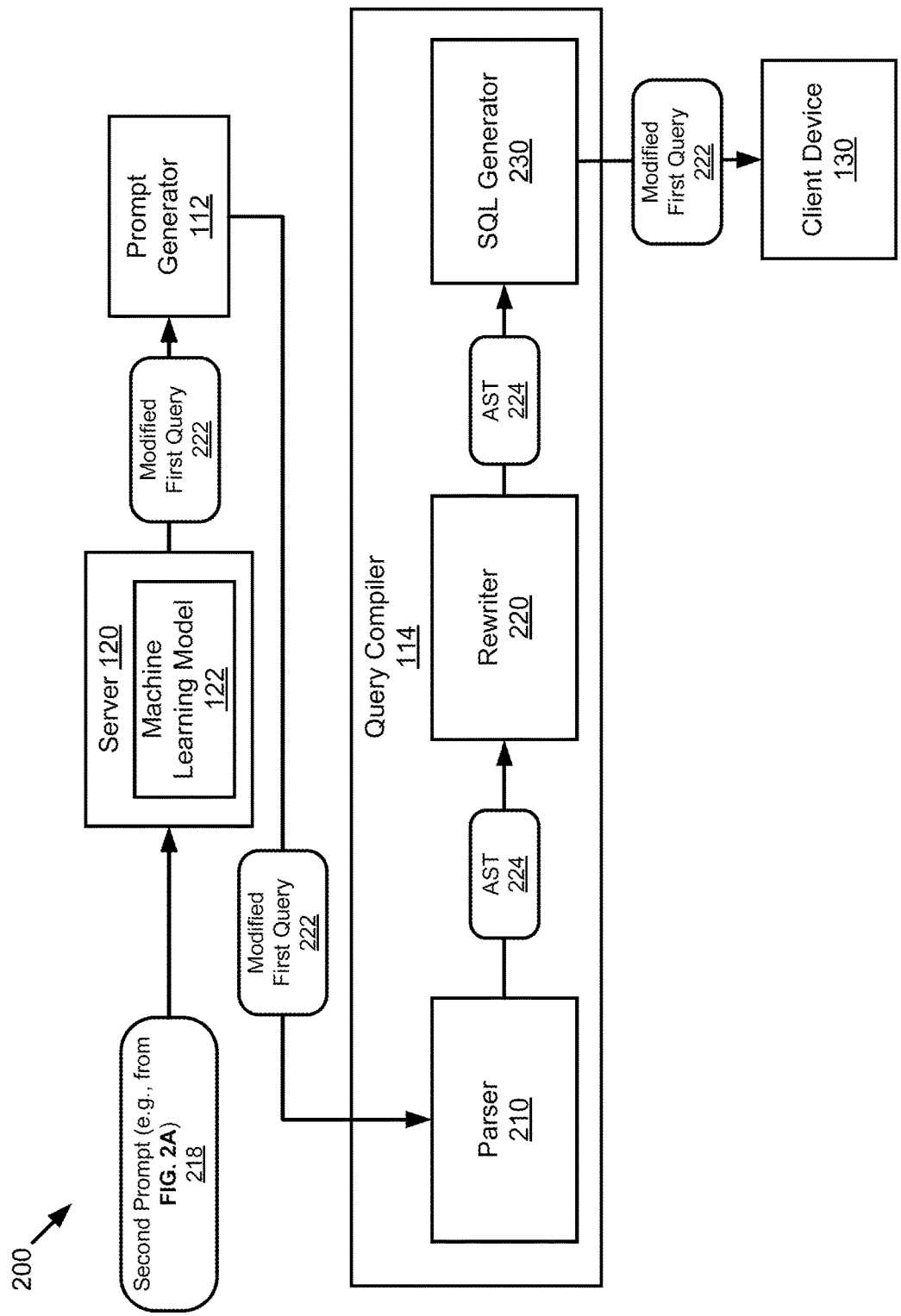
FIG. 2B illustrates another example system architecture for using a compiler to modify prompts for MLMs used to generate database queries, in accordance with some embodiments of the disclosure.
Figure 2C:
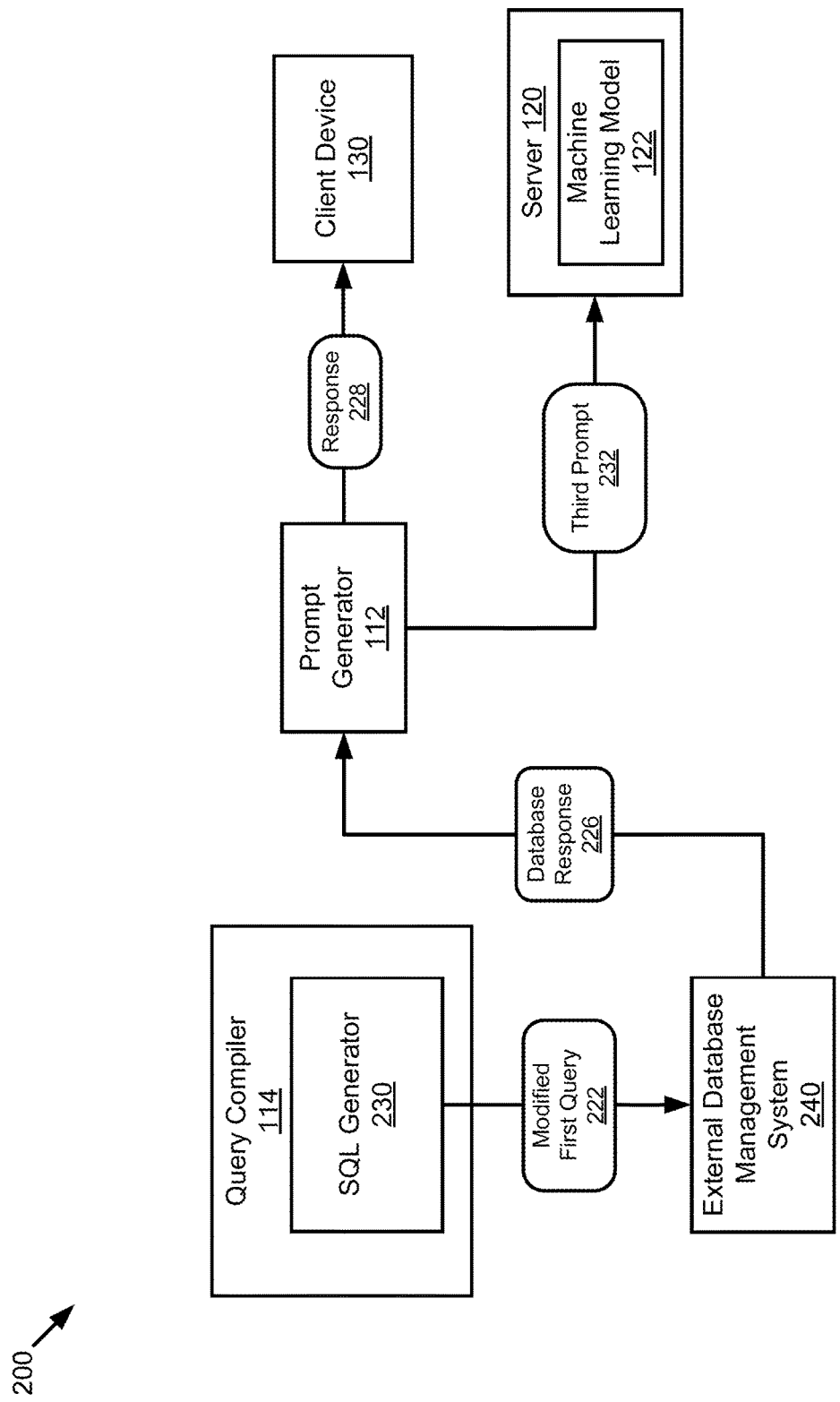
FIG. 2C illustrates another example system architecture for using a compiler to modify prompts for MLMs used to generate database queries, in accordance with some embodiments of the disclosure.

FIGS. 2A-C illustrate an example system architecture 200 used to obtain, modify, and execute a database query generated by an MLM, in accordance with some embodiments of the disclosure. Components of FIG. 1 are used to help describe aspects of FIGS. 2A-2C. The system architecture 200 (also referred to as a "system" herein) includes a prompt generator 112, a query compiler 114, a DBMS 116, a server 120, a MLM 122, or a client device 130, as described with respect to FIG. 1.

As illustrated, in some embodiments, the client device 130 may send a prompt 202 to the prompt generator 112. The prompt 202 may include text data that includes a natural language input that requests the MLM 122 to generate a database query. As an example, the prompt 202 may include text data that includes, "List the name and corresponding student ID number of all students that are currently enrolled in Biology 204 and whose grade in the class is less than 80%."

In some embodiments, the prompt generator 112 may receive the prompt 202 from the client device 130. In some embodiments, the prompt generator 112 may modify the prompt 202 to generate a modified prompt 204. In some embodiments, modifying the prompt 202 may include rewording the text of the prompt. For example, the prompt generator 112 may modify the above example text to state, "Given the following database tables, generate an SQL query that lists the name and corresponding student ID number of all students that are currently enrolled in Biology 204 and whose grade in the class is less than 80%." In some embodiments, rewording the text may include specifying to generate an SQL query, specifying an SQL dialect, or indicating that database schema or table information is to follow the text.

In one embodiment, modifying the prompt 202 may include adding context information 203 to the prompt 202. Adding context information 203 may include adding text data that describes a database schema or tables of a database. The prompt generator 112 may obtain the context information 203 from the DBMS 116. The prompt generator 112 may send data requesting the context information 203 to the DBMS 116, and the DBMS 116 may provide response data that includes the context information 203. It can be noted that in some embodiments, the system 200 may not modify prompt 202 and submit prompt 202 to MLM 122 to generate first query 206.

FIG. 3 depicts an example modified prompt 300, in accordance with some embodiments. For example, modified prompt 300 may be a modification of original prompt 202, "List the name and corresponding student ID number of all students that are currently enrolled in Biology 204 and whose grade in the class is less than 80%." In some embodiments, the modified prompt 300 may be used as the modified prompt 204. As illustrated in FIG. 3, the modified prompt may include a request 302 for the MLM 122 to generate a database query. The request 302 may include text data describing the client device's 130 request. As noted above, the request 302 may be based on the prompt 202 provided by the client device 130. The modified prompt 300 may include one or more table definitions 304. The one or more table definitions 304 may include text data that describe a table of the database, including the table name (e.g., "STUDENTS"), the one or more columns in the table (e.g., "name," "studentID," "GPA," etc.), and a data type of a column (e.g., "TEXT," "NUMBER," "DATE," etc.). The modified prompt 300 may include one or more table references 306. A table reference may indicate that a column from one table references a column in another table (e.g., "STUDENTS(studentID)→ENROLLMENT(studentID)" may indicate that the "studentID" column in the "STUDENTS" table references the "studentID" column in the "ENROLLMENT" table. A table reference 306 may indicate use of a foreign key or other referencing data in the database. The table definitions 304 or table references 306 may be based on the context information 203.

Returning to FIG. 2A, in one or more embodiments, the prompt generator 112 may send the modified prompt 204 to the server 120, which may provide the modified prompt 204 to the MLM 122. The MLM 122 may accept the modified prompt 204 as input and may execute the modified prompt 204. The MLM 122 may generate a first query 206 in response to executing the modified prompt 204. The first query 206 may include a database query generated by the MLM 122. The server 120 may send the first query 206 to the prompt generator 112.

In one embodiment, the prompt generator 112 may provide the first query 206 to the query compiler 114. In some embodiments, the query compiler 114 may include one or more of a parser 210, a rewriter 220, or a SQL generator 230. In some embodiments, the parser 210 may be configured to parse a database query (which may be provided in SQL) into an AST 208. An AST 208 may include a hierarchical representation of the database query's structure and may capture components and their relationships without the intricacies of the specific query language syntax. The AST 208 may act as an intermediate representation between the textual query and its execution and may facilitate analysis, optimization, or transformation by the query compiler 114. In some embodiments, the AST's 208 root node may represent the overall query type, such as SELECT, INSERT, or UPDATE. Child nodes may represent subqueries, clauses, expressions, or other components, each with their own attributes and relationships. By deconstructing the first query 206 into a structured tree, the AST 208 may enable various operations, such as identifying joins, extracting data constraints, or validating query correctness.

In some embodiments, the parser 210 may provide the AST 208 to the rewriter 220. The rewriter 220 may be configured to use the AST 208 to detect errors in the first query 206. In some embodiments, the rewriter 220 may detect one or more types of errors. In some embodiments, the rewriter 220 may detect a table resolution error. A table resolution error may include the first query 206 referring to a table that does not exist in the database. In some embodiments, the rewriter 220 may detect a column resolution error. A column resolution error may include the first query 206 referring to a column that does not exist in the relevant table. In some embodiments, the rewriter 220 may detect a type annotation error. A type annotation error may include the first query 206 attempting to use a column's value as an input to a function, but the column's datatype may not be compatible with the function's argument. For example, the first query 206 may include the use of a "dateTruncate" function configured to accept a DATE datatype as an argument and return a truncated version of the input date. However, the first query 206 may have included a column with a TEXT datatype as the input argument. In some embodiments, the rewriter 220 may detect a common table expression (CTE) resolution error. A CTE resolution error may include the first query 206 referring to a CTE that does not exist in the first query 206. In some cases, a CTE error may occur because the first query 206 may include nested CTEs, and some SQL dialects may not allow nested CTEs. The rewriter 220 may detect other types of errors in the first query 206 by examining the corresponding AST 208.

In one embodiment, the rewriter 220 may detect a divide-by-zero error. A divide-by-zero error may include the first query 206 including a division operation and the denominator of the division operation not including a mechanism that prevents execution of the division operation if the denominator is 0. For example, the first query 206 may include the statement "SELECT 2/i FROM k" where the value of i could be 0 and there is no mechanism to prevent execution of the statement if i is 0.

In some embodiments, the rewriter 220 may detect a quoted column error. In some embodiments, a column name can be case-sensitive or case-insensitive. If a column name is defined using quotation marks, the column name is case-sensitive. A quoted column error may include (1) the first query 206 defining a column (either in a conventional statement or in a CTE statement) using quotation marks, and (2) using the column without quotation marks later in the first query 206. A quoted column error may include (1) the first query 206 defining a column without using quotation marks, and (2) using the column with quotation marks later in the first query 206.

In some embodiments, the rewriter 220 may detect an incorrect argument order error. An incorrect argument order error may include the first query 206 using a function but the arguments to the function are in the wrong order. For example, the first query 206 may include the statement "SELECT trim('.', date) FROM transactions" which may be intended to select the values from the "date" column of the "transactions" table and remove occurrences of the "." character from the date. However, the trim function's order of arguments may be first, the string that is to be trimmed and second, the character to be trimmed from the string. Thus, in the previous example, the arguments may be in the wrong order.

In some embodiments, the rewriter 220 may be configured to correct an error in the AST 208. In some embodiments, the rewriter 220 may correct a table resolution error by one or more of (1) identifying a table name in the AST 208 that is not present in the database, (2) identifying a possible correct table name that is present in the database, and (3) modifying the table name in the AST 208 to the identified correct table name. In some embodiments, identifying a possible correct table name may include the rewriter 220 identifying a possible correct table name that is within a threshold string distance from the table name in the AST 208 (e.g., the table name "STUDENT" in the AST 208 may be within a threshold string distance from the actual table name "STUDENTS"). In some embodiments, identifying a possible correct table name may include the rewriter 220 identifying the columns of the table name used in the AST 208 and identifying a table in the database that includes those columns. Identifying the possible correct table name may include other operations, in some embodiments.

In one embodiment, the rewriter 220 may correct a column resolution error by one or more of (1) identifying a column name in the AST 208 that is not present in the database for the relevant table, (2) identifying a possible correct column name that is present in the relevant table, and (3) modifying the column name in the AST 208 to the identified correct column name. In some embodiments, identifying the possible correct column name may include the rewriter 220 identifying a possible correct column name that is within a threshold string distance from the column name in the AST 208 (e.g., the column name "student_ID" in the AST 208 may be within a threshold string distance from the correct column name "studentID"). In some embodiments, identifying a possible correct column name may include locating a lineage of the columns. Identifying the possible correct column name may include other operations, in some embodiments.

In some embodiments, the rewriter 220 may correct a type annotation error by one or more of (1) identifying a use of a column in the AST 208 whose datatype is incompatible with its use in the AST (e.g., using the column as an argument to a function, stored procedure, or other operation), (2) identifying an operation to convert the data from the column in the AST 208 to the correct datatype, and (3) modifying the use of the column in the AST 208 to convert the column data to the correct datatype. As an example, the rewriter 220 may identify, in the AST 208, the use of a column whose datatype is TEXT. The rewriter 220 may identify that the column is being used as an argument for a "dateTruncate" function configured to accept a DATE datatype as an argument and return a truncated version of the input date. In response, the rewriter 220 may modify the AST 208 to wrap the column name in a function that converts a TEXT datatype to a DATE datatype (e.g., text-ToDate). Thus, the rewriter 220 may modify the AST 208 to include the statement dateTruncate(textToDate(column_name)).

In one embodiment, the rewriter 220 may correct a divide-by-zero error. In some embodiments, the rewriter 220 may modify the statement to include a function or other mechanism that protects against a division operation from dividing by zero. For example, where the first query 206 includes "SELECT 2/i FROM k," the rewriter 220 may modify the first query 206 to include "SELECT 2/nullIf(i, 0) FROM k" where nullIf is a function that detects whether i is 0, and if so, returns a null value to prevent the execution of the division operation.

In some embodiments, the rewriter 220 may correct a quoted column error. In some embodiments, in response to the first query 206 defining a column using quotation marks, the rewriter 220 may modify a subsequent use of the column to use quotation marks. In some embodiments, in response to the first query 206 defining a column without using quotation marks, the rewriter 220 may modify a subsequent use of the column to not use quotation marks.

In one embodiment, the rewriter 220 may correct an incorrect argument order error. In some embodiments, the rewriter 220 may analyze the use of a function in the first query 206 and determine if the value being used as an argument to the function matches the function's expected datatype for that value. If the argument to the function does not match the function's expected datatype for that value, the rewriter 220 may reorder the values in the first query 206 to match the expected datatypes. For example, the example first query 206 may include the statement "SELECT trim('.', date) FROM transactions." The rewriter 220 may determine that the function takes a string value as its first argument and a character value as its second argument. The rewriter 220 may then analyze the values "'.'" and "date" in the first query 206 and determine that the first value is a string datatype and the second value is a character datatype. In response, the rewriter 220 may modify the order of the values in the first query 206 so the first query 206 is "SELECT trim(date, '.') FROM transactions."

In some cases, the rewriter 220 may not be able to correct all of the errors in the AST 208. Such errors may be referred to, herein, as "uncorrectable errors." The rewriter 220 may provide the modified AST 212 to the SQL generator 230. The modified AST 212 may include an AST based on the AST 208 that the parser provided to the rewriter 220, however, the modified AST 212 may include corrections made by the rewriter 220. The SQL generator 230 may be configured to convert an AST to a database query. The SQL generator 230 may accept the modified AST 212 as input and generate a corresponding second database query 214 (e.g., to distinguish it from the first query 206 generated by the MLM 122). The SQL generator 230 may output the second database query 214 to the prompt generator 112. In some embodiments, the first query 206 and the second database query 214 may include queries in different SQL dialects.

In one embodiment, the query compiler 114 may provide one or more prompt elements 216 to the prompt generator 112. In some embodiments, a prompt element 216 may include information that describes the one or more uncorrectable errors in the second database query 214. In some embodiments, a prompt element 216 may include information that is different from, or in addition to, a conventional error message (if any) from a conventional database query compiler. For example, in some embodiments, a prompt element 216 can be formatted in a format that is acceptable to the MLM 122 (e.g., valid input). In some embodiments, the prompt element 216 can be formatted in natural language. In one or more embodiments, the information describing the uncorrectable error(s) may include information about the location of the uncorrectable error in the second database query 214 (e.g., a line number or a portion of the SQL code). In some embodiments, the information describing the uncorrectable error(s) may include text describing the type of error (table resolution, column resolution, incorrect datatype, etc.). In one embodiment, a prompt element 216 may include one or more suggestions to the MLM 122 regarding how to correct an uncorrectable error. In some embodiments, the information describing the one or more uncorrectable errors may include information based on an error message generated by the rewriter 220 or the DBMS 116 in response to attempting to execute the AST 208. A prompt element 216 may be generated by the parser 210, the rewriter 220, the SQL generator 230, or some other component of the query compiler 114.

In one embodiment, the second database query 214 may include the one or more prompt elements 216. In some embodiments, the query compiler 114 may output the second database query 214 and the one or more prompt elements 216 separately to the prompt generator 112 (as shown in FIG. 2A). In some embodiments, the prompt generator 112 may generate a second prompt 218 based on the second database query 214 and the one or more prompt elements 216. In some embodiments, the second prompt 218 may include the second database query 214 and the information describing the one or more uncorrectable errors. Similar to the modified prompt 204, as discussed above, the second prompt 218 may include context information that may help the MLM 122 generate a database query, in some embodiments. The second prompt 218 may include other information, in some embodiments.

FIG. 4 depicts an example second prompt 400, in accordance with some embodiments. In some embodiments, the second prompt 400 may be used as the second prompt 218. In one embodiment, the second prompt 400 may include one or more of the table definitions 304 or table references 306. However, in some embodiments, the second prompt 400 may not repeat context information that was provided in the modified prompt 300. This may occur in response to, for example, the server 120 including conversation functionality that provides previous inputs from the same user to the MLM 122 as context information for a prompt. The second prompt 400 may include the second database query 402. The second database query 402 may include the database query generated by the SQL generator 230 that contains one or more uncorrectable errors. The second prompt 400 may include information 404 describing the one or more uncorrectable errors. The information 404 may further include a request to correct the uncorrectable error(s).

FIG. 2B continues the example flow of data depicted in FIG. 2A. In some embodiments, responsive to receiving the second prompt 218 as depicted in FIG. 2A, the MLM 122 may output a modified first query 222. In some embodiments, the modified first query 222 may include a database query that corrects the uncorrectable error(s) included in the second database query generated by the SQL generator 230. The MLM 122 may provide the modified first query 222 to the prompt generator 112. The prompt generator 112 may provide the modified first query 222 to the parser 210 of the query compiler 114. The parser 210 may parse the modified first query 222 into another AST 224 and provide the AST 224 to the rewriter 220. The rewriter 220 may analyze the AST 224 for errors. In some embodiments, in response to the AST 224 not including any errors, the rewriter 220 may send the AST 224 to the SQL generator 230 to convert the AST back into the modified first query 222. The SQL generator 230 may then send the modified first query 222 to the client device 130. The user of the client device 130 may use a GUI to view the modified first query 222 in order to make decisions about the modified first query 222 (e.g., whether the execute the modified first query using a database).

FIG. 2C continues the example flow of data depicted in FIG. 2B. In one embodiment, responsive to the AST 224 not including any errors, the SQL generator 230 may submit the modified first query 222 to an external DBMS 240 for execution. The external DBMS 240 may include a database that includes data on which the modified first query 222 may execute. The external DBMS 240 may include a database operated or controlled by an entity that operates or controls the client device 130. In some embodiments, the external DBMS 240 may include the external database from which the DBMS 116 obtains metadata about the tables, columns, and other schema data of the external database. In some implementations, the external DBMS 240 may include similar functionality, operations, or structures to those of the DBMS 116 (e.g., a query processor, a metadata catalog, a log manager, reporting or monitoring tools, etc.). The external DBMS 240 may be compatible with one or more database query languages or one or more database query language dialects. In one or more implementations, the external DBMS 240 may be external from the query generation platform 110. In some implementations, the query generation platform 110 may include the external DBMS 240 (e.g., the external DBMS 240 may form part of the DBMS 116).

In one or more embodiments, the external DBMS 240 may generate a database response 226. The database response 226 may include data requested by the modified first query 222 (e.g., for a SELECT query, data that is responsive to the SELECT statement of the query). The database response 226 may include data indicating whether the query was successful (e.g., for an INSERT query, data indicating whether the data in the INSERT query was successfully added to the database). The external DBMS 240 may provide the database response 226 to the prompt generator 112. The prompt generator 112 may generate a response 228 and provide the response 228 to the client device 130. In some embodiments, the response 228 may include data indicating whether the query generated from the user's first prompt 202 was successful, data that was requested by the query that was generated from the user's first prompt 202, or other data. The user of the client device 130 may use a GUI to view the response 228.

In some embodiments, the database response 226 may include an error message. The database response 226 may include an error message in response to the modified first query 222 containing one or more errors that the parser 210 or the rewriter 220 may not have detected. Similar to FIG. 2B, responsive to the database response 226 containing the error message, the prompt generator 112 may generate a third prompt 232. The third prompt 232 may include the modified first query 222 and information describing the one or more errors described in the error message of the database response 226. The third prompt 232 may include context information that may help the MLM 122 generate a database query, in some embodiments. The third prompt 232 may include other information. The prompt generator 232 may send the third prompt 232 to the MLM 122 so the MLM 122 can correct the one or more errors in the modified first query 222. The MLM 122 may correct the one or more errors, generate a second modified first query with the error(s) corrected, and send the second modified first query to the prompt generator 112 so the query compiler 114 can verify that the second modified first query does not contain errors.

Figure 5B:
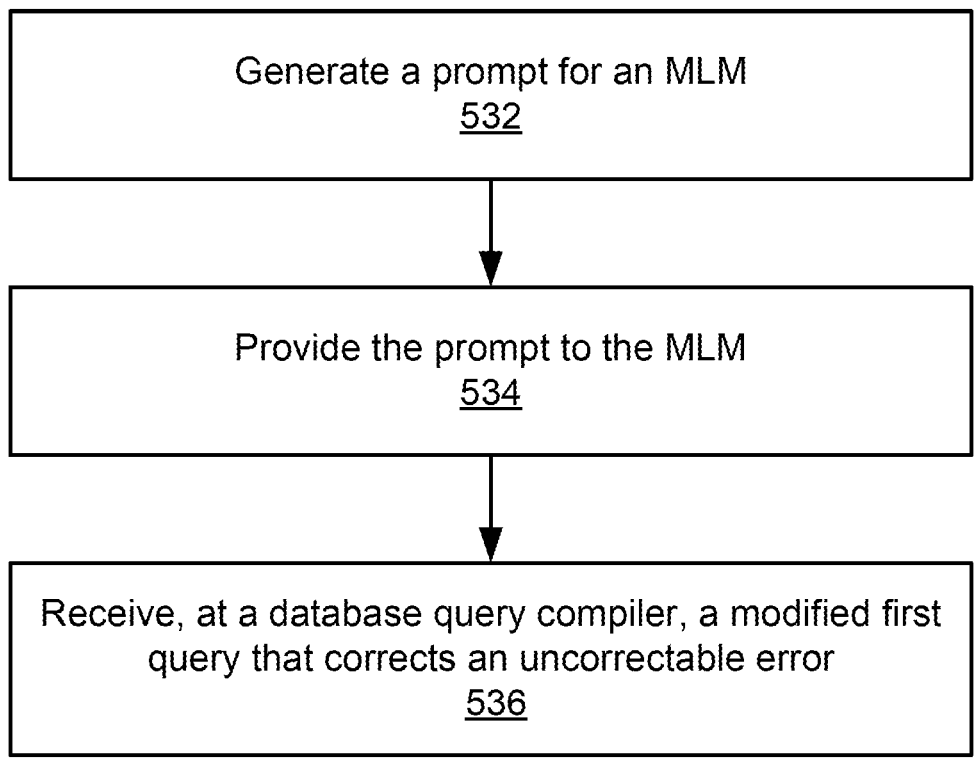
FIG. 5B depicts a flow diagram of another example method of using a compiler to modify prompts for MLMs used to generate database queries s, in accordance with some embodiments of the disclosure.
Figure 5C:
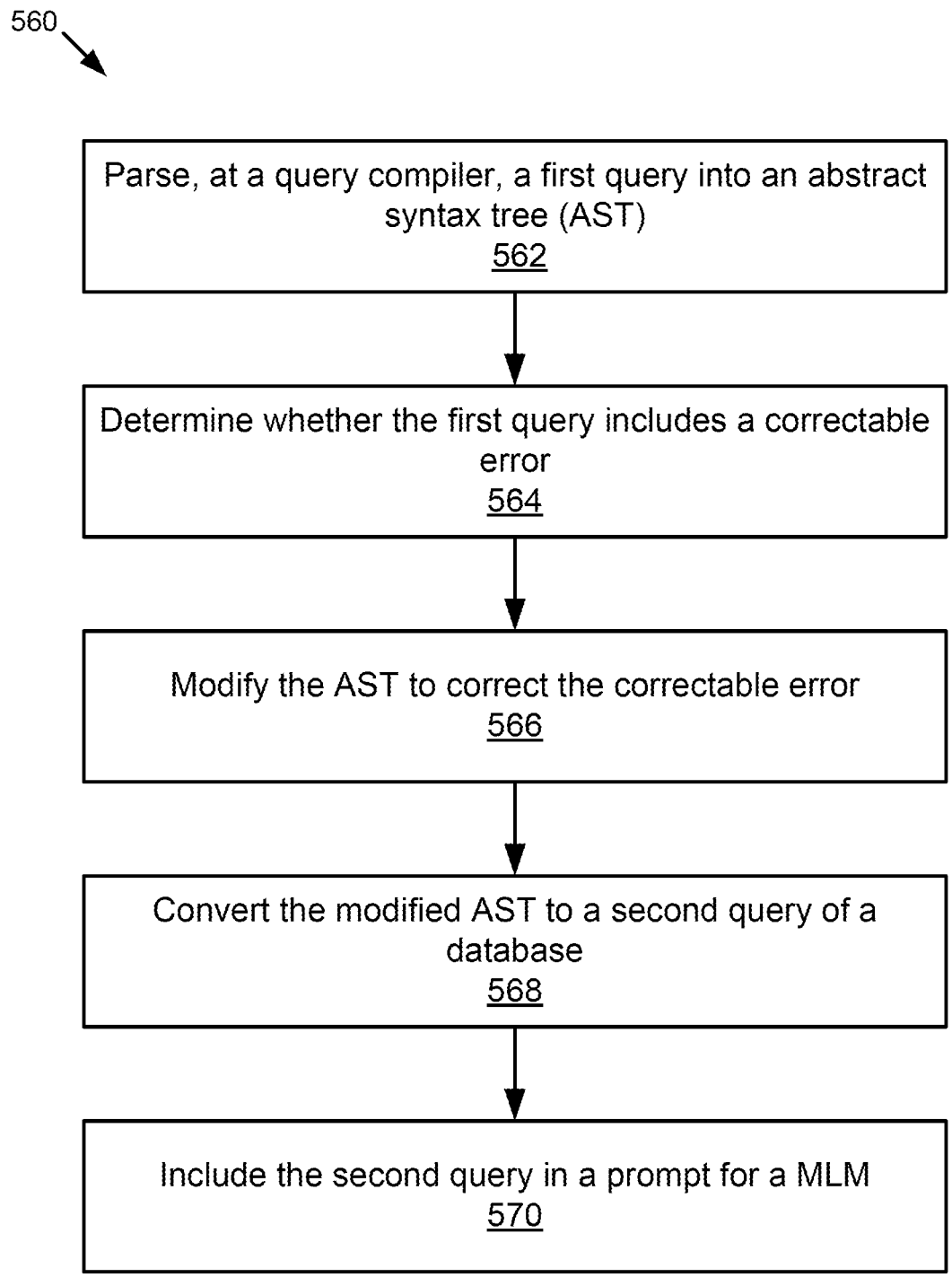
FIG. 5C depicts a flow diagram of another example method of using a compiler to modify prompts for MLMs used to generate database queries, in accordance with some embodiments of the disclosure.

FIGS. 5A-5C illustrate example methods 500, 530, and 560, respectively. The methods 500, 530, 560, or each of the aforementioned methods' individual functions, routines, subroutines, or operations can be performed by a processing device, having one or more processing units (CPU) and memory devices communicatively coupled to the CPU(s). In some embodiments, the aforementioned methods can be performed by a single processing thread or alternatively by two or more processing threads, each thread executing one or more individual functions, routines, subroutines, or operations of the methods. The aforementioned methods as described below can be performed by processing logic that can include hardware (e.g., a processing device, circuitry, dedicated logic, programmable logic, microcode, hardware of a device, integrated circuit, etc.), software (e.g., instructions run or executed on a processing device), or a combination thereof. In some embodiments, the methods 500, 530, or 560 may be performed by one or more of the prompt generator 112, the query compiler 114 (including the parser 210, the rewriter 220, or the SQL generator 230), or the DBMS 116, described in FIG. 1, FIGS. 2A-C. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed. It may be noted that elements of FIG. 1-4 may be used herein to help describe FIG. 5A-5C.

In FIG. 5A, at operation 502, processing logic receives, at a query compiler, a first query of a database. In some embodiments, the query compiler may include the query compiler 114. The first query may include the first query 206. The query compiler 114 may receive the first query 206 from an MLM 122. The first query 206 may include a database query generated by the MLM 122 in response to receiving the modified prompt 204, and the modified prompt 204 may have been generated by the prompt generator 112 in response to receiving a first prompt 202 from the client device 130.

At operation 504, processing logic determines, by the query compiler, whether the first query comprises an uncorrectable error. In some embodiments, an uncorrectable error may include an error in the first query 206 that the query compiler 114 may not be able to correct. In some embodiments, operation 504 may include analyzing the AST 208 to identify the uncorrectable error.

At operation 506, responsive to processing logic determining that the first query includes an uncorrectable error, processing logic generates a prompt element. The prompt element may describe the uncorrectable error. The prompt element may be structured for inclusion in a prompt requesting the MLM to generate a modified first query that corrects the uncorrectable error. In one embodiment, the prompt element may include the prompt element 216. The prompt requesting the MLM to generate the modified first prompt may include the second prompt 218. The modified first query may include the modified first query 222.

In some embodiments, the prompt element may identify a location of the uncorrectable error in the first query. This may include the prompt element 216 including information that may indicate where in the second query (i.e., the query generated by the SQL generator 230) the uncorrectable error is located. In some embodiments, the prompt element may identify instructions to correct the uncorrectable error. This may include the prompt element 216 including instructions generated by the rewriter 220 or the SQL generator 230 that provide information on how to correct the uncorrectable error. In some embodiments, the prompt element 216 may include a column lineage, which may help the MLM 122 identify a correct column. The prompt generator 112 may include the error location or error correction information in the second prompt 218 that is provided to the MLM 122.

In FIG. 5B, at operation 532, processing logic generates a prompt for the MLM. In some embodiments, the MLM may include the MLM 122. The prompt may include the second prompt 218, which may include data based on the prompt element 216 (e.g., a second database query generated by the SQL generator 230, context information, etc.). At operation 534, processing logic provides the prompt to the MLM. At operation 536, responsive to providing the prompt, processing logic receives, at a database query compiler, a modified first query that corrects an uncorrectable error. The database query compiler may include the query compiler 114. The modified first query may include the modified first query 222. The prompt generator 112 may receive the modified first query 222, and the prompt generator 112 may provide the modified first query 222 to the query compiler 114. In some embodiments, one or more of the operations 532-536 of the method 530 may execute after the method 500.

In FIG. 5C, at operation 562, processing logic parses, at a query compiler, a first query into an AST. The query compiler may include the query compiler 114. The first query may include the first query 206. The AST may include the AST 208. The parser 210 may perform the parsing.

At operation 564, processing logic determines whether the first query include a correctable error. A correctable error may include an error in the first query that the query compiler 114 can correct without having to provide the first query to the MLM 122. At operation 566, responsive to determining that the first query comprises a correctable error, processing logic modifies the AST to correct the correctable error. This may include the rewriter 220 modifying the AST 208 to correct the correctable error.

At operation 568, processing logic converts the modified AST to a second query of the database. The modified AST may include the modified AST 212. The second query may include the second query generated by the SQL generator 230 and included in the prompt element 216. The second query may include a database query based on the first query 206 and which includes one or more uncorrectable errors. At operation 570, processing logic includes the second query in a prompt for an MLM. The prompt may include the second prompt 218. The MLM may include the MLM 122. In some embodiments, processing logic may execute one or more of the operations 562-570 of the method 560 as part of operations 504 or 506 of the method 500.

Figure 6:
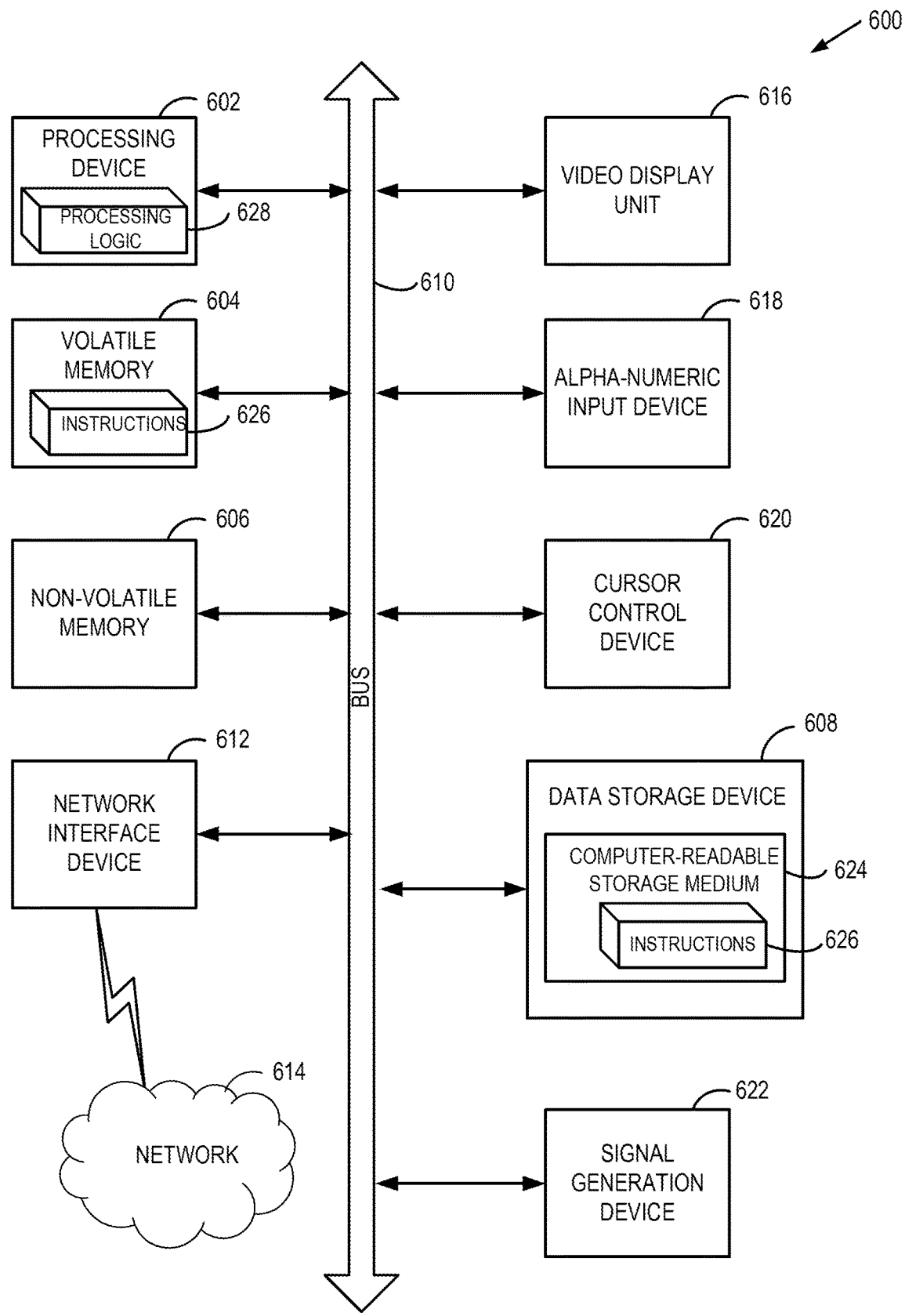
FIG. 6 is a block diagram illustrating an example computer system, in accordance with some embodiments of the disclosure.

FIG. 6 is a block diagram illustrating an example computer system 600, in accordance with an embodiment of the disclosure. The computer system 600 executes one or more sets of instructions that cause the machine to perform any one or more of the methodologies discussed herein. The terms "set of instructions," "instruction set," "instructions," and the like may refer to instructions that, when executed by computer system 600, cause the computer system 600 to perform one or more operations of using a compiler to modify prompts for MLMs used to generate database queries. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" may include any collection of machines that individually or jointly execute the sets of instructions to perform any one or more of the methodologies discussed herein.

The computer system 600 includes a processing device 602, a volatile memory 604 (e.g., read-only memory (ROM), flash memory, dynamic random access memory (DRAM) such as synchronous DRAM (SDRAM), a non-volatile memory 606 (e.g., flash memory, static random access memory (SRAM), etc.), and a data storage device 608, which communicate with each other via a bus 610.

The processing device 602 represents one or more general-purpose processing devices such as a microprocessor, CPU, graphics processing unit (GPU), or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 628 or instructions of the system architecture 100 or the query generation platform 110 for performing the operations discussed herein.

The computer system 600 may further include a network interface device 612 that provides communication with other machines over a network 614, such as a LAN, an intranet, an extranet, or the Internet. The network 614 may include the computer network 140. The computer system 600 also may include a video display device 616 (e.g., a liquid crystal display (LCD) or a cathode ray tube (CRT)), an alphanumeric input device 618 (e.g., a keyboard), a cursor control device 620 (e.g., a mouse), and a signal generation device 622 (e.g., a speaker). In some embodiments, the video display device 616 and the alphanumeric input device 618 may include a combined display and input device, such as a touchscreen.

The data storage device 608 may include a non-transitory computer-readable storage medium 624 on which is stored the sets of instructions 626 of the system architecture 100 embodying any one or more of the methodologies or functions described herein. For example, sets of instructions 626 can implement one or more operations performed by one or more of prompt generator 112, query compiler 114, or DBMS 116. The sets of instructions 626 of the system architecture 100 may also reside, completely or at least partially, within the volatile memory 604 and/or within the processing device 602 during execution thereof by the computer system 600, the volatile memory 604 and the processing device 602 also constituting computer-readable storage media. The sets of instructions 626 may further be transmitted or received over the network 614 via the network interface device 612.

While the example of the computer-readable storage medium 624 is shown as a single medium, the term "computer-readable storage medium" can include a single medium or multiple media (e.g., a centralized or distributed database, and/or associated caches and servers) that store the sets of instructions 626. The term "computer-readable storage medium" can include any medium that is capable of storing, encoding or carrying a set of instructions for execution by the machine and that causes the machine to perform any one or more of the methodologies of the disclosure. The term "computer-readable storage medium" can include, but is not be limited to, solid-state memories, optical media, or magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "providing", "receiving", "generating", "parsing", "analyzing", "modifying", "converting", "including", "requesting", "determining", "sending", "identifying", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" and similar terms are used herein to mean serving as an example, instance, or illustration. Any aspect or design described herein as "example" is not necessarily to be construed as preferred or advantageous over other aspects or designs. Rather, use of the words "example" or similar terms is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment," "one embodiment," or "some embodiments," throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above-described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A computer-implemented method, comprising:
receiving, at a query compiler, a first query of a database, the first query at least in part generated by a machine learning model (MLM);
parsing, at the query compiler, the first query into an abstract syntax tree (AST);
prior to executing the first query at the database,
determining whether the first query comprises a correctable error;
responsive to determining that the first query comprises the correctable error, modifying the first query to correct the correctable error;
determining, by the query compiler, whether the first query comprises an uncorrectable error by analyzing the AST to identify the uncorrectable error, wherein the uncorrectable error comprises an error in the first query that is uncorrectable by the query compiler; and
responsive to determining that the first query comprises the uncorrectable error, generating a prompt element that describes the uncorrectable error and that is structured for inclusion in a prompt requesting the MLM to generate a modified first query that corrects the uncorrectable error, wherein the prompt element is further configured to instruct the MLM to correct the uncorrectable error; and
responsive to providing the prompt to the MLM, receiving, from the MLM, a response comprising the modified first query that corrects the uncorrectable error remaining in the first query, wherein the response received from the MLM with the modified first query corrects the uncorrectable error in the first query that the query compiler was not able to correct.

2. The computer-implemented method of claim 1, further comprising:
generating the prompt for the MLM; and
providing the prompt to the MLM.

3. The computer-implemented method of claim 1, wherein the uncorrectable error comprises a table resolution error in the first query.

4. The computer-implemented method of claim 1, wherein the prompt element identifies a location of the uncorrectable error in the first query.

5. The computer-implemented method of claim 1, wherein the prompt element identifies instructions to correct the uncorrectable error.

6. The computer-implemented method of claim 1, wherein the MLM comprises a large language model (LLM).

7. The computer-implemented method of claim 1, wherein the prompt element identifies at least a portion of a database schema of the database.

8. The computer-implemented method of claim 7, wherein modifying the first query to correct the correctable error comprises:
modifying the AST to correct the correctable error.

9. The computer-implemented method of claim 8, further comprising:
converting the modified AST to a second query of the database; and
including the second query in the prompt for the MLM.

10. A computer-implemented system, comprising:
a memory; and
a processing device, coupled to the memory, to perform operations comprising:
receiving, at a query compiler, a first query of a database, the first query at least in part generated by a machine learning model (MLM);
parsing, at the query compiler, the first query into an abstract syntax tree (AST);
prior to executing the first query at the database,
determining whether the first query comprises a correctable error;
responsive to determining that the first query comprises the correctable error, modifying the first query to correct the correctable error;
determining, by the query compiler, whether the first query comprises an uncorrectable error by analyzing the AST to identify the uncorrectable error, wherein the uncorrectable error comprises an error in the first query that is uncorrectable by the query compiler; and
responsive to determining that the first query comprises the uncorrectable error, generating a prompt element that describes the uncorrectable error and that is structured for inclusion in a prompt requesting the MLM to generate a modified first query that corrects the uncorrectable error, wherein the prompt element is further configured to instruct the MLM to correct the uncorrectable error; and
responsive to providing the prompt to the MLM, receiving, from the MLM, a response comprising the modified first query that corrects the uncorrectable error remaining in the first query, wherein the response received from the MLM with the modified first query corrects the uncorrectable error in the first query that the query compiler was not able to correct.

11. The computer-implemented system of claim 10, wherein the operations further comprise:
generating the prompt for the MLM; and
providing the prompt to the MLM.

12. The computer-implemented system of claim 10, wherein the uncorrectable error comprises a column resolution error in the first query.

13. The computer-implemented system of claim 10, wherein the prompt element identifies a location of the uncorrectable error in the first query.

14. The computer-implemented system of claim 10, wherein the prompt element identifies instructions to correct the uncorrectable error.

15. The computer-implemented system of claim 10, wherein the MLM comprises a large language model (LLM).

16. The computer-implemented system of claim 10, wherein the operations further comprise:
modifying the AST to correct the correctable error;
converting the modified AST to a second query of the database; and
including the second query in the prompt for the MLM.

17. A non-transitory computer-readable medium comprising instructions, that responsive to execution by a processing device, cause the processing device to perform operations comprising:
receiving, at a query compiler, a first query of a database, the first query at least in part generated by a machine learning model (MLM);
parsing, at the query compiler, the first query into an abstract syntax tree (AST);
prior to executing the first query at the database,
determining whether the first query comprises a correctable error;

responsive to determining that the first query comprises the correctable error, modifying the first query to correct the correctable error;

determining, by the query compiler, whether the first query comprises an uncorrectable error by analyzing the AST to identify the uncorrectable error, wherein the uncorrectable error comprises an error in the first query that is uncorrectable by the query compiler; and responsive to determining that the first query comprises the uncorrectable error, generating a prompt element that describes the uncorrectable error and that is structured for inclusion in a prompt requesting the MLM to generate a modified first query that corrects the uncorrectable error, wherein the prompt element is further configured to instruct the MLM to correct the uncorrectable error; and responsive to providing the prompt to the MLM, receiving, from the MLM, a response comprising the modified first query that corrects the uncorrectable error remaining in the first query, wherein the response received from the MLM with the modified first query corrects the uncorrectable error in the first query that the query compiler was not able to correct.

18. The non-transitory computer-readable medium of claim 17, wherein the uncorrectable error comprises a type annotation error in the first query.

19. The non-transitory computer-readable medium of claim 17, wherein the prompt element identifies at least one of:
 a location of the uncorrectable error in the first query; or
 instructions to correct the uncorrectable error.

20. The non-transitory computer-readable medium of claim 17, wherein the operations further comprise:
 generating the prompt for the MLM; and
 providing the prompt to the MLM.

* * * * *